United States Patent
Szinyi

(10) Patent No.: US 9,193,256 B2
(45) Date of Patent: Nov. 24, 2015

(54) HYBRID MODULE FOR ARRANGEMENT IN A DRIVE TRAIN OF A MOTOR VEHICLE

(71) Applicant: Dr. Ing. h.c. F. Porsche Aktiengesellschaft, Stuttgart (DE)

(72) Inventor: Odon Szinyi, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/066,832

(22) Filed: Oct. 30, 2013

(65) Prior Publication Data

US 2014/0121057 A1     May 1, 2014

(30) Foreign Application Priority Data

Oct. 30, 2012   (DE) .......................... 10 2012 110 365

(51) Int. Cl.
| | |
|---|---|
| *B60K 6/38* | (2007.10) |
| *B60K 6/48* | (2007.10) |
| *B60K 6/387* | (2007.10) |
| *B60K 11/06* | (2006.01) |
| *B60K 11/08* | (2006.01) |
| *B60K 1/00* | (2006.01) |

(52) U.S. Cl.
CPC . *B60K 6/48* (2013.01); *B60K 6/387* (2013.01); *B60K 11/06* (2013.01); *B60K 11/08* (2013.01); *B60K 2001/006* (2013.01); *Y10S 903/902* (2013.01); *Y10T 477/26* (2015.01)

(58) Field of Classification Search
USPC .............. 310/78, 92, 96, 101, 112, 52; 477/5; 475/5; 180/68.1, 65.21, 68.2
See application file for complete search history.

(56) References Cited

U.S. PATENT DOCUMENTS

| | | | | |
|---|---|---|---|---|
| 2,723,356 | A * | 11/1955 | Jaeschke ......................... | 310/59 |
| 7,509,802 | B2 * | 3/2009 | Hammond et al. ............. | 60/330 |
| 2006/0037813 | A1 | 2/2006 | Ozeki et al. | |

FOREIGN PATENT DOCUMENTS

| | | |
|---|---|---|
| DE | 10 2005 003 077 | 8/2006 |
| WO | 2012/008911 | 1/2012 |

OTHER PUBLICATIONS

German Search Report of Jul. 29, 2013.

* cited by examiner

*Primary Examiner* — Colby M Hansen
(74) *Attorney, Agent, or Firm* — Gerald E. Hespos; Michael J. Porco; Matthew T. Hespos

(57) ABSTRACT

A hybrid module (1) is installed a drive train of a motor vehicle between a combustion engine and a transmission and has an electric machine and a clutch installed in a common housing (2). The hybrid module (1) further has an air supply entrance (7) for introducing cooling air into the hybrid module (1). The air supply entrance (7) is an oval with a short axis directed toward the combustion engine and the transmission. Thus, the hybrid module has a short extent between combustion engine and transmission, and also allows a sufficiently large quantity of air to be supplied into the hybrid module.

8 Claims, 1 Drawing Sheet

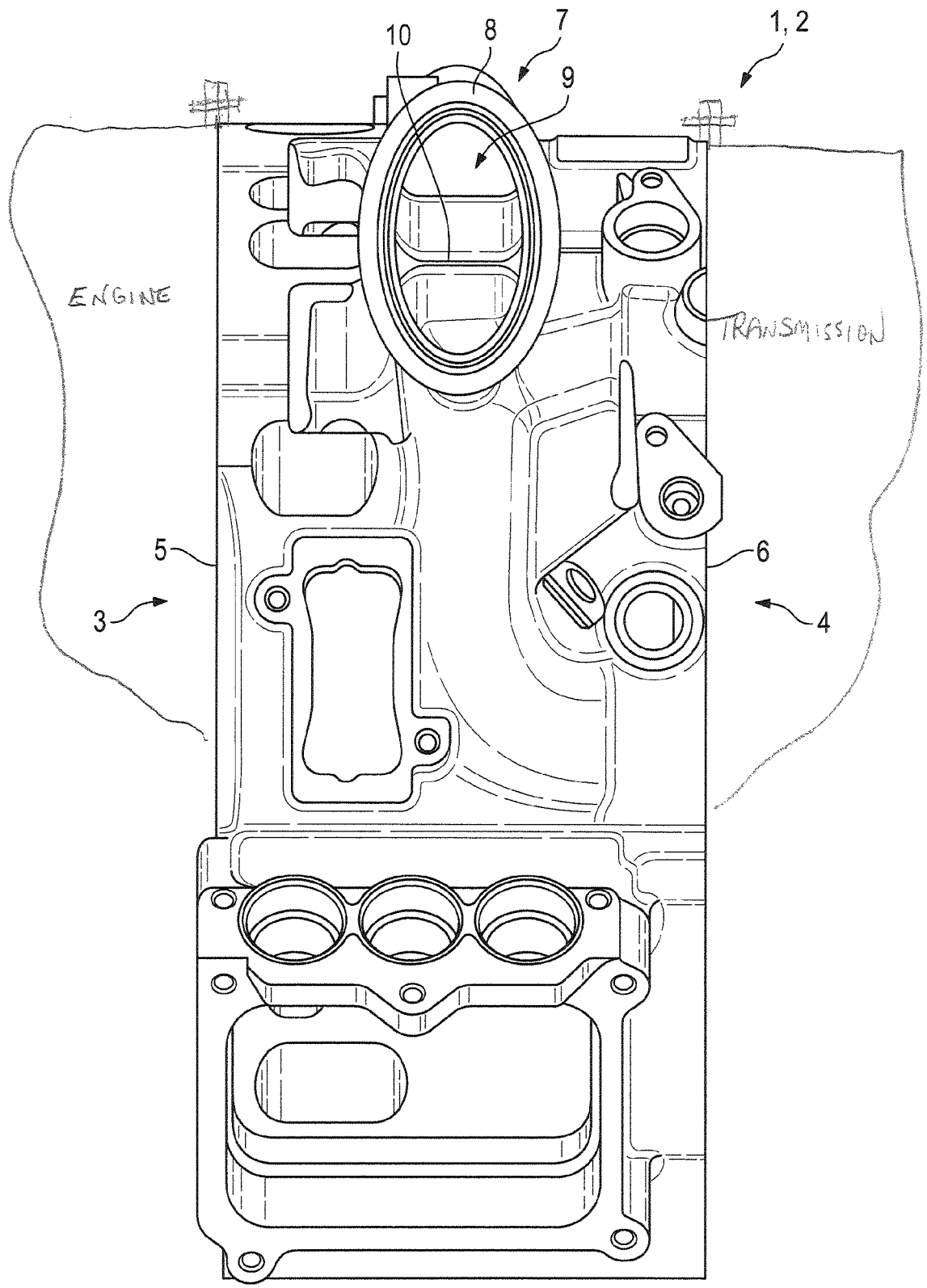

HYBRID MODULE FOR ARRANGEMENT IN A DRIVE TRAIN OF A MOTOR VEHICLE

CROSS REFERENCE TO RELATED APPLICATION

This application claims priority under 35 USC 119 to German Patent Appl. No. 10 2012 110 365.8 filed on Oct. 30, 2012, the entire disclosure of which is incorporated herein by reference.

BACKGROUND

1. Field of the Invention

The invention relates to a hybrid module for arrangement in a drive train of a motor vehicle between a combustion engine and a transmission. The hybrid module has an electric machine and a clutch installed in a common housing. An air supply means introduces cooling air into the hybrid module.

2. Description of the Related Art

Manufacturers offer motor vehicles, in particular passenger cars, optionally with or without a hybrid module. Accordingly, either the transmission is flanged directly on the combustion engine or the hybrid module is placed between the combustion engine and the transmission. In latter case, the hybrid module has a flange on one side for connecting to the combustion engine and a flange on the opposite side for connecting to the transmission. The positions of the flanges or screw connections preferably are exactly coaxial on both sides of the hybrid modules so that, when using the combustion engine and the transmission in a motor vehicle without a hybrid module, both can be screwed directly to one another.

DE 10 2005 003 077 A1 discloses a hybrid module of the type described above. Air slots are provided in the housing of the hybrid module disclosed in DE 10 2005 003 077 A1 for introducing air to cool the hybrid module. These air slots pass through the housing radially on the outside in its region directed toward the transmission.

The object of the invention is to provide a hybrid module with a relatively small extent, with respect to its ability to be arranged between engine and transmission, while allowing a sufficiently large quantity of air to be supplied into the hybrid module.

SUMMARY OF THE INVENTION

The invention relates to a hybrid module that has an oval air supply means with the short extent of the oval directed toward the combustion engine and the transmission.

The oval air supply means and its arrangement allow a relatively large hydraulic cross section to supply a sufficient quantity of air, while having a relatively small extent in the longitudinal direction of the hybrid module, and particularly in the extent of the hybrid module between the combustion engine and the transmission.

The air supply means has a stub of oval design on the outside. The hydraulic cross section of the air supply means also preferably is of oval design.

The air supply means preferably has an air divider for dividing the air flow into partial flows, thereby admitting air to different regions of the hybrid module. Accordingly, the oval air supply facilitates placement of the air divider.

The air divider preferably is connected to the stub in the region of the short extent of the oval. As a result, partial cross sections can be formed in the hydraulic cross section and have a relatively small ratio of length to width extent. Thus, the individually formed partial cross sections have a large length/width ratio.

The hybrid module preferably can be screwed to the combustion engine and the transmission, and the screw connection are exactly coaxial on both opposite sides of the hybrid modules. The screw connections on the opposite sides of the hybrid module thus are identical. Thus, the combustion engine and the transmission can be connected directly via the same screw connections when no hybrid module is to be used.

The hybrid module preferably is designed so that the electric machine is arranged radially on the outside and the clutch radially on the inside.

The invention thus cools the hybrid module with an air supply means that is of oval design and with the short extent of the oval directed toward the combustion engine and the transmission. The air supply means has a relatively large cross section to introduce sufficient cooling air into the hybrid module. The hybrid module can be relatively narrow so as to require little installation space. As a result, the hybrid module has an air supply with a large cross section, and the coaxial flanges or screw connections on opposite sides of the hybrid module where the connection with the combustion engine and the transmission takes place enables the hybrid module easy to mount.

Further features of the invention will emerge from the appended drawing and the description of the preferred exemplary embodiment represented in the drawing.

BRIEF DESCRIPTION OF THE DRAWINGS

FIG. 1 is a plan view of the hybrid module according to the invention.

DETAILED DESCRIPTION OF THE PREFERRED EMBODIMENTS

A hybrid module 1 is to be arranged in a drive train of a motor vehicle. The hybrid module 1 has a housing 2. The housing 2 has a first side 3 that can be connected to a combustion engine and a second side 4 that can be connected to a transmission. The sides 3 and 4 have plane-parallel bearing faces 5 and 6 for engaging and bearing against corresponding bearing faces of the combustion engine and the transmission. Bores or threaded bores (not shown) in the housing 2 near the bearing faces 5 and 6 and enable the hybrid module 1 to be screwed to the combustion engine and the transmission. The positions of the connections on both opposite sides 3 and 4 of the housing 2 are exactly coaxial so that, when no hybrid module 1 is to be provided, the combustion engine and the transmission can be screwed directly to one another.

The hybrid module 1 comprises an electric machine, not illustrated, arranged radially outside within the housing 2 and a clutch, likewise not illustrated, arranged radially on the inside within the housing 2.

An air supply entrance 7 is provided to cool the hybrid module 1. The air supply means is an oval with a short extent of the oval between the sides 3 and 4 of the housing 2, so that the short extent of the oval is directed toward the combustion engine and the transmission. The air supply entrance 7 has a stub 8 of oval design on the outside. The air supply entrance 7 has a hydraulic cross section 9 that also is of oval design, with this oval being oriented in a corresponding manner to the outer oval of the stub 8.

The inner contour of the stub 8 and the contour of the hydraulic cross section 9, is arranged, with respect to the arrangement of the ellipse, in a corresponding manner to the outer contour of the stub 8. As a result, the stub 8 has a small wall thickness.

The air supply entrance 7 thus has a relatively large cross section to introduce sufficient cooling air into the hybrid module 1. In this case, the hybrid module 1, specifically the housing 2, can have a relatively narrow construction so as to require little installation space. The oval air supply entrance 7 has a large cross section and is made easy to mount by the coaxial flanges or screw connections on the left and right sides 3 and 4 of the housing 2.

The air supply entrance 7 has an air divider 10 for dividing the air flow into partial flows, for admitting air to different regions of the hybrid module 1. The air divider 10 is connected to the stub 8 in the region of the short extent of the oval.

What is claimed is:

1. A hybrid module for arrangement in a drive train of a motor vehicle, the drive train having a combustion engine and a transmission spaced from the combustion engine, the hybrid module comprising:
   a housing having opposite first and second ends spaced apart along a longitudinal direction, the first end being configured to be connected to the combustion engine and the second end being configured to be connected to the transmission; and
   an air supply stub formed on an exterior of the housing and defining an air supply entrance extending into the housing for introducing cooling air into the hybrid module, the air supply stub and the air supply entrance being substantially oval with each having a long axis and a short axis normal to the long axis, the short axis being substantially parallel to the longitudinal direction.

2. The hybrid module of claim 1, wherein the air supply entrance has an air divider for dividing the cooling air flow into partial airflows for admitting the cooling air to different regions of the hybrid module.

3. The hybrid module of claim 2, wherein the air divider is connected to spaced apart locations on the stub to bridge the air supply entrance and extends substantially parallel to the short axis of the oval defined by the stub.

4. The hybrid module of claim 1, further comprising screw connections on the opposite first and second ends of the housing of the hybrid module and being connectable to the combustion engine and the transmission respectively, the screw connections on the first end being aligned coaxially with the screw connections on the second end.

5. The drive train of claim 1, wherein the air supply stub has an air divider for dividing the cooling air flow into partial airflows for admitting the cooling air to different regions of the hybrid module.

6. The drive train of claim 5, wherein the air divider is connected to the stub and extends substantially parallel to the short axis of the oval defined by the stub.

7. A drive train for a hybrid motor vehicle, the drive train comprising:
   a combustion engine;
   a transmission spaced from the combustion engine along a longitudinal direction; and
   a hybrid module disposed between the combustion engine and the transmission in the longitudinal direction and having a housing with opposite first and second ends, the first end being connected to the combustion engine and the second end being connected to the transmission, an air supply stub formed on an exterior of the housing and defining an air supply entrance extending into the housing for introducing cooling air into the hybrid module, the air supply stub and the air supply entrance being substantially oval with a long axis and a short axis normal to the long axis, the short axis being aligned parallel to the longitudinal direction between the combustion engine and the transmission.

8. The drive train of claim 7, wherein the air supply stub is the only air supply stub formed on the housing.

\* \* \* \* \*